(12) United States Patent
Kim et al.

(10) Patent No.: US 6,434,588 B1
(45) Date of Patent: Aug. 13, 2002

(54) BINARY COUNTER WITH LOW POWER CONSUMPTION

(75) Inventors: Yang-Ho Kim; Yong-Chun Kim; Kyoung-Mook Lim; Seh-Woong Jeong, all of Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/407,742

(22) Filed: Sep. 28, 1999

(30) Foreign Application Priority Data

Sep. 29, 1998 (KR) .......................................... 98-40586

(51) Int. Cl.[7] ................................................ G06F 7/50
(52) U.S. Cl. ...................................................... 708/672
(58) Field of Search ................................ 708/672, 700; 377/49

(56) References Cited

U.S. PATENT DOCUMENTS

| | | | |
|---|---|---|---|
| 4,092,522 A | 5/1978 | Miller | 235/308 |
| 4,395,762 A | 7/1983 | Wondergem et al. | 364/484 |
| 4,499,589 A | 2/1985 | Geesen | 377/55 |
| 4,587,665 A | 5/1986 | Minakuchi | 377/116 |
| 4,837,791 A * | 6/1989 | Nakanishi et al. | 377/49 |
| 5,023,893 A | 6/1991 | Leung et al. | 377/117 |
| 5,045,854 A | 9/1991 | Windmiller | 341/97 |
| 5,164,969 A | 11/1992 | Alley et al. | 377/39 |
| 5,425,074 A | 6/1995 | Wong | 377/47 |
| 5,504,698 A * | 4/1996 | Su | 708/672 |
| 5,635,858 A * | 6/1997 | Chang et al. | 708/672 |
| 5,682,111 A | 10/1997 | Bacrania et al. | 327/143 |
| 5,682,342 A * | 10/1997 | Suzuki | 708/672 |
| 6,347,327 B1 * | 2/2002 | Petro et al. | 708/672 |

OTHER PUBLICATIONS

Sedra et al., *Microelectronic Circuits,* Holt, Rinehart and Winston, 1982, pp. 233–234.

* cited by examiner

*Primary Examiner*—David H. Malzahn
(74) *Attorney, Agent, or Firm*—Myers Bigel Sibley & Sajovec

(57) ABSTRACT

Disclosed is a novel n-bit binary counter with low power consumption, which comprises a set of half-adders for adding a "1" to an n-bit input signal, which includes a lower-order m bit component and a higher-order (n–m) bit component, and a set of D (data) flip-flops for storing outputs of the half-adders. The set of half-adders are divided into two sections, one of which is a first adder section for adding a "1" to the lower-order m bit component and the other of which is a second adder section for adding a carry signal from the first adder section to the higher-order (n–m) bit component. The set of D flip-flops are divided into two sections, one of which is a first register section to store outputs of the first adder section and the other of which is a second register section to store outputs of the second adder section. The n-bit input signal is comprised of the outputs of the first and second register sections. The novel n-bit binary counter further comprises a clock gating circuit which allows the second register section to store the outputs of the second adder section only when the carry signal of "1" is generated from the first adder section. Since D flip-flops of the second register section are not toggled until the carry signal of "1" is generated from the first -adder section.

14 Claims, 2 Drawing Sheets

BINARY COUNTER WITH LOW POWER CONSUMPTION

FIELD OF THE INVENTION

The present invention relates to a binary counter circuit, and more particularly to a counter circuit with low power consumption.

BACKGROUND OF THE INVENTION

A counter is a register that goes through a predetermined sequence of states upon the application of input pulses, and is used for counting the numbers of occurrence of an event and are useful for generating timing signals to control the sequence of operations in digital computers. An n-bit binary counter is capable of sequentially incrementing or decrementing a binary value, and in detail goes through a sequence of binary numbers such as 0000, 0001, 0010, 0011, and so on. The n-bit binary counter which has n flip-flops synchronized with a clock signal and counts follows a sequence of states according to the binary count of n bits, from 0 to $2^n-1$. Of the n-bit binary value, the lower-order bit is complemented after every count and every other bit is complemented from one count to the next if and only if all its lower-order bits are equal to 1. For example, the binary count from 0111(7) to 1000(8) is obtained by (a) complementing the lower-order bit, (b) complementing the second-order bit because the first bit of 0111 is 1, (c) complementing the third-order bit because the first two bits of 0111 are 1's, and (d) complementing the fourth-order bit because the first three bits of 0111 are all 1's.

As described immediately above, a higher-order bit, (n−m)-bit of the n-bit binary counter is complemented at the next operation after all bits of the lower m-bit are 1's. In other hands, no the higher (n−m)-bit is complemented until all of the lower m-bit are 1's.

The n-bit binary counter mentioned above as a prior art has a problem in that there is unnecessary power consumption in the binary counter because clocks are applied even to flip-flops corresponding to the higher (n−m)-bit where no data change is during the incrementing or decrementing operation thereof.

SUMMARY OF THE INVENTION

The present invention is intended to solve the problem, and it is an object of the invention to provide a low power consumption counter which has a clock gating circuit for preventing unnecessary power consumption.

It is the other object of the present invention to provide a lower power consumption counter wherein no flip-flops corresponding to the higher-order bit component are clock-toggled during the incrementing operation thereof until a carry signal is generated from the final one of flip-flops corresponding to the lower-order bit component.

According to one aspect of the present invention, an n-bit binary counter with low power consumption comprises a first adder section for adding a "1" to a lower-order m-bit component of an n-bit input signal and producing a carry signal when the lower-order m-bit component is all 1's, said n-bit input signal having the lower-order m-bit component and a higher-order (n−m)-bit component; a second adder section for adding the carry signal to the higher-order (n−m)bit component; a first register for storing output of the first adder section in response to a first clock signal; a second register for storing output of the second adder section in response to a second clock signal; and means for receiving the first clock signal and the carry signal, and producing the second clock signal when the carry signal is generated from the first adder section. The n-bit input signal is composed of outputs of the first and second register sections.

BRIEF DESCRIPTION OF THE DRAWINGS

This invention may be understood and its objects will become apparent to those skilled in the art by reference to the accompanying drawings as follows.

DETAILED DESCRIPTION OF PREFERRED EMBODIMENTS

The present invention will be described with reference to a sample preferred embodiment, but it must be recognized that the present invention can be widely modified and varied, and the scope of the present invention is not limited except as set forth in the accompanying claims.

Figure 1:
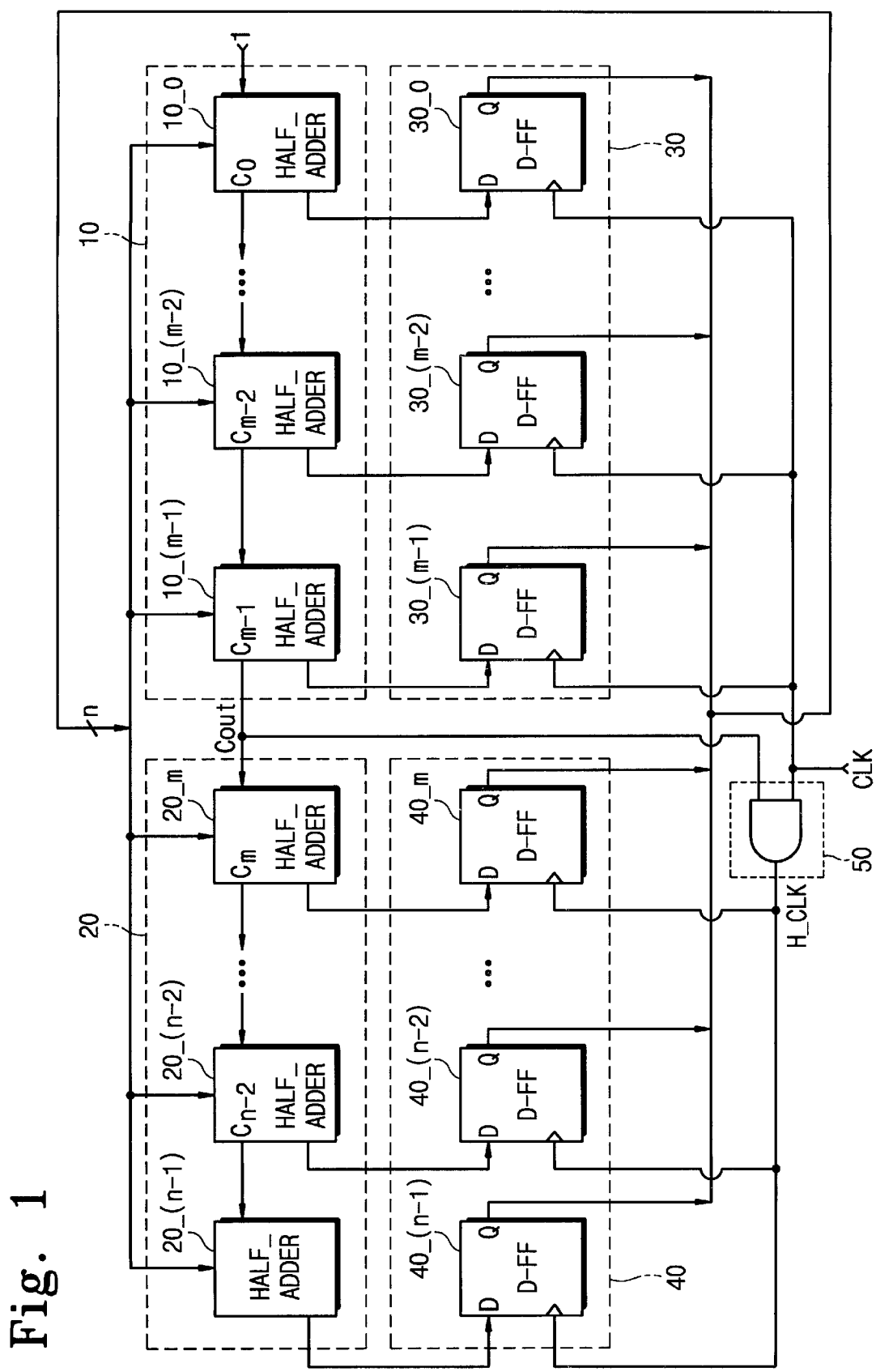
FIG. 1 is a circuit diagram showing a novel n-bit binary counter according to the present invention.

FIG. 1 shows a novel n-bit binary counter using the concept of the present invention.

Referring to FIG. 1, a novel n-bit binary counter in accordance with the present invention comprises a set of half-adders for adding a "1" to an n-bit input signal, which includes a lower-order m bit component and a higher-order (n−m) bit component, and a set of D (data) flip-flops for storing outputs of the half-adders. The set of half-adders are divided into two sections, one of which is a first adder section 10 for adding a "1" to the lower-order m bit component and the other of which is a second adder section 20 for adding a carry signal from the first adder section 10 to the higher-order (n−m) bit component. The set of D flip-flops are divided into two sections, one of which is a first register section 30 to store outputs of the first adder section 10 and the other of which is a second register section 40 to store outputs of the second adder section 20. The n-bit input signal is comprised of the outputs of the first and second register sections. The novel n-bit binary counter further comprises a clock gating circuit 50 which allows the second register section 40 to store the outputs of the second adder section 20 only when the carry signal of "1" is generated from the first adder section 10. As a result, since D flip-flops of the second register section 40 are not toggled until the carry signal of "1" is generated from the first adder section 10, the n-bit binary counter can prevent unnecessary power consumption therein.

Referring again to FIG. 1, the first adder section 10 has m half-adders 10_0, . . . , 10_(m−1) which are connected in series and receive the lower-order m-bit component through their input terminals. Of the m half-adders, the half-adder 10_0 at a first stage receives a "1" as a carry signal and adds the "1" to the rightmost of the lower-order m-bit component, i.e., the most least bit. Each of the other half-adders 10_1, . . . , 10_(m−1) of the m half-adders receive carry signals $C_0$, $C_{m-2}$, $C_{m-1}$ of pre-stages to the other bits of the lower-order m-bit component, respectively. For example, the first adder section 10 adds a "1" to the lower-order m-bit component, and produces a carry signal $C_{out}$ of "1" when the m-bit component is all 1's.

The second adder section 20 shown in FIG. 1 has (n−n) half-adders 20_m, . . . , 20_(n−2), and 20_(n−1) which are connected in series and receive the higher-order (n−m)-bit component through their input terminals. Of the (n−n) half-adders, the half adder 20__m at a first stage receives the carry signal $C_{out}$ of "1" from the first adder section 10, as a carry signal, and adds the "1" to the rightmost bit of the higher-order (n−m)-bit component. Each of the other half-adders 20__(m+), . . . , 20__(n−1) of the (n−n) half-adders receive carry signals $C_m, \ldots, C_{n-2}$ at pre-stages to the other bits of the higher-order (n−m)-bit component, respectively. For example, the second adder section 20 adds the carry signal of "1" supplied from the first adder section 10 to the higher-order (n−m)-bit component.

The first register section 30 shown in FIG. 1 is an m-bit register which has m D(data) flip-flops 30__0, . . . , 30__(m−2), and 30__(m−1), and stores the output of the first adder section 10 in synchronization with an externally applied clock CLK.

The second register section 40 shown in FIG.1 is a (n−m)-bit register which has (n−n) D flip-flops 40__m, . . . , 40__(n−2) and 40__(n−1), and stores the output of the second adder section 20 in synchronization with a clock H__CLK, which is supplied from the clock gating circuit 50.

The clock gating circuit 50 is comprised of, for example, an AND gate for receiving and gating the externally applied clock and the carry signal $C_{out}$ supplied from the first adder section 10 to produce the clock H__CLK, which is supplied to the second register section 40. Herein, to gate the clock CLK means to perform logical operation (e.g., ANDing operation) of the clock CLK and the carry signal $C_{out}$ of "1", that is, that the clock CLK is supplied through the clock gating circuit 50 to the second register section 40 only while the carry signal of "1" is generated from the first adder section 10. Alternatively, instead of the AND gate, a NAND gate may be used as the clock gating circuit. The carry signal $C_{out}$ from the first adder section 10 is used as an enable signal of the clock gating circuit 50. If the AND gate is used as the clock gating circuit 50, the second register section 40 is synchronized at each rising edge of the clock H__CLK. But if the NAND gate is used as the clock gating circuit 50, the second register section 40 is synchronized at each falling edge of the clock H__CLK.

In the n-bit binary counter as described above, the total number of registers (i.e., the toggling number of clock) can be obtained by the following equation (1):

$$T(m) = (n-m) \cdot \frac{1}{2^m} + m \tag{1}$$

In the equation (1), n is a bit width of the n-bit binary counter, and m is the number of flip-flops which receive the externally applied clock immediately, whereas n and m are positive integers.

Figure 2:
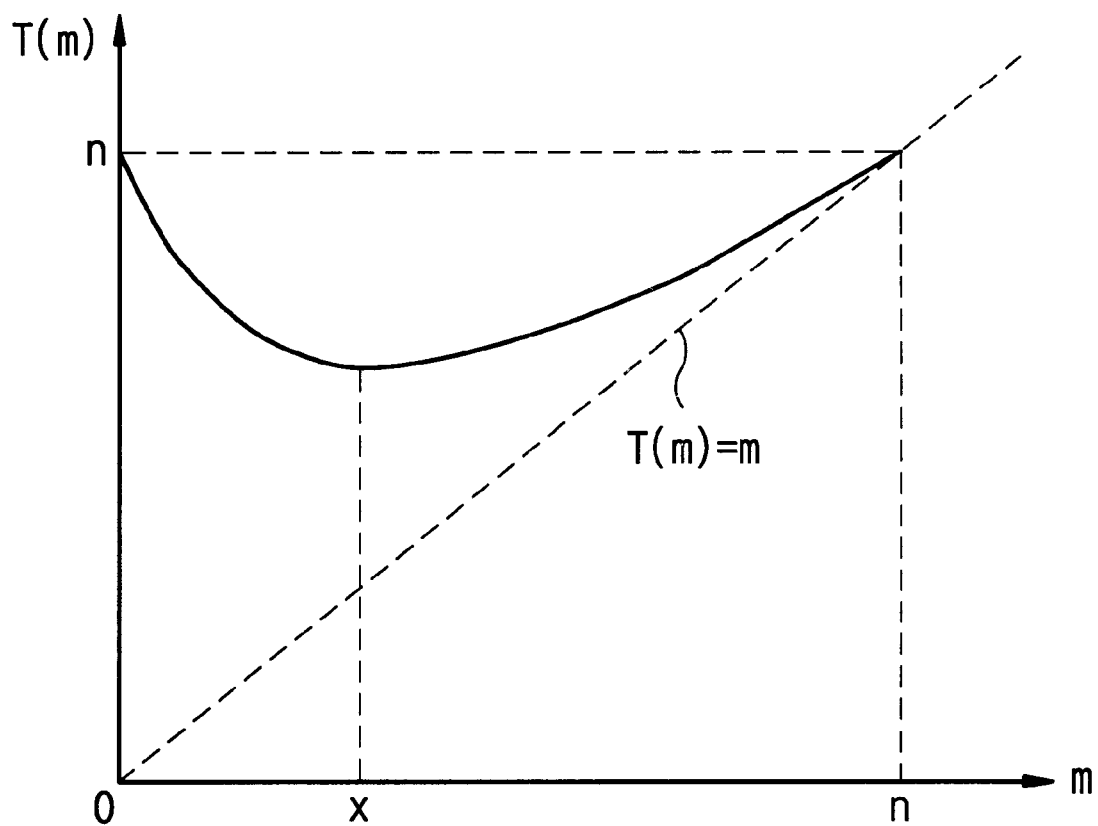
FIG. 2 is a graph showing the number of flip-flops which are triggered every time that an externally applied clock signal is toggled, when an m-value of the binary counter of FIG. 1 is changed from 0 to n, whereas m is the number of flip-flops which receive the clock signal immediately.

FIG. 2 is a graph showing the number of flip-flops which are triggered every time that the externally applied clock is toggled once, when the m value of the n-bit binary counter is varied from "0" to "n".

As can be seen from FIG. 2, the number of the triggered flip-flops is decreased in case that the m value is between "0" and "x" points, and is gradually increased in case that the m value is above the "x" point. When the m value is equal to the "x" point, the number of the triggered flip-flops becomes minimum. Thus, when the value of the "x" point, the m value obtained by partial-differentiating T(m) with m is equal to "0", the total number of the triggered flip-flops will be a minimum value. This can be expressed by the following equation (2):

$$\frac{\partial}{\partial m} T(m) = 0 \tag{2}$$

The m value to meet the equation (2) can be used to determine the bit width of the lower-order m-bit component. However, since it is difficult to obtain the positive m value to meet the equation (2), the positive m value may be easily obtained by the following inequalities (3) and (4):

$$T(m) \leq T(m-1) \tag{3}$$

$$T(m) \leq T(m+1) \tag{4}$$

The inequalities (3) and (4) can be expressed by a system of inequalities (5) as follows:

$$(2^m + m - 2) \leq n \leq (2^{m+1} - 1) \tag{5}$$

Table 1 listed below shows n and m values to meet the above equation (5).

TABLE 1

| n value | m value |
| --- | --- |
| 4~9 | 2 |
| 9~18 | 3 |
| 18~35 | 4 |
| : | : |

As can be seen from the table 1, in case of 4-bit binary counter, when m is equal to 2, the total number of flip-flops triggered every time that the clock CLK is toggled is minimum. For example, in case of a prior art 20-bit binary counter, the total number of triggered flip-flops is twenty, but in case of a 20-bit binary counter using the concept of the present invention, since n is 20 and m is 4 as shown in Table 1, the total number of triggered flip-flops can be obtained using the above-mentioned equation (1) as follows:

$$T(m) = (n-m)\frac{1}{2^m} + m$$

$$T(4) = (20-4)\frac{1}{2^4} + 4$$

$$= 5$$

As can be seen from the above-described solution, the total number of triggered flip-flops in the 20-bit binary counter is five on the average.

Since the n-bit binary counter of FIG. 1 has the clock gating circuit, AND gate 50 which regards as a load of clock, gain η can be obtained by the following equation (6):

$$\eta = 1 - \frac{(T(4)+1)}{T(20)} = 0.7 \tag{6}$$

As can be seen from the equation (6), the 20-bit binary counter according to the present invention has superior gain, for example, 70% to the prior art counter.

As described above, each bit width of the first adder and register sections 10 and 30 can be determined according to the minimum value of m which is obtained by the equations (1)~(5). Then each bit width of the second adder and register sections 20 and 40 is equal to (n−m). The clock CLK is applied to the m D flip-flops 30__0, . . . , 30__(m−2), and 30__(m−1m) constituting the first register section 30, and the clock H_CLK from the AND gate 50 is applied to the (n−n) D flop-flops 40_m, ..., 40_(n−2), and 40_(n−1) constituting the second register section 40. The clock H_CLK is generated by ANDing the clock CLK and the carry signal $C_{out}$, which is generated from the first adder section 10 when all of the lower-order m-bit component to the first adder section 10 are 1's.

Accordingly, the (n−m) D flip-flops 40_m, ..., 40_(n−2), and 40_(n−1) of the second register section 40 receive simultaneously once the clock H_CLK from the AND gate 50 when the clock CLK is toggled $2^m$ times.

As described above, since an n-bit binary counter according to the present invention can prevent unnecessary clock toggling operations of partial components, for example, D flip-flops of second register section shown in FIG. 1, total power consumption thereof can be reduced.

While this invention has been particularly shown and described with reference to the sample embodiment thereof, it will be understood by those skilled in the art that various changes in form and details may be made without departing from the sprit and scope of this invention.

What is claimed is:

1. A n-bit binary counter with low power consumption comprising:

a first adder section for adding a "1" to a lower-order m-bit component of an n-bit input signal and producing a carry signal when the lower-order m-bit component is all 1's, said n-bit input signal having the lower-order m-bit component and a higher-order (n−m)-bit component;

a second adder section for adding the carry signal to the higher-order (n−m)bit component;

a first register for storing output of the first adder section in response to a first clock signal;

a second register for storing output of the second adder section in response to a second clock signal; and means for receiving the first clock signal and the carry signal, and producing the second clock signal when the carry signal is generated from the first adder section, wherein the n-bit input signal is composed of outputs of the first and second register sections.

2. The n-bit binary counter according to claim 1, wherein a bit width of the lower-order m-bit component is determined by an m value to allow a $[(n-m)/2^n+m]$ value to be minimum, whereas m is a positive integer.

3. The n-bit binary counter according to claim 1, wherein said means comprises an AND gate for ANDing the first clock signal and the carry signal to produce the second clock signal.

4. The n-bit binary counter according to claim 1, wherein said means comprises a NAND gate for NANDing the first clock signal and the carry signal to produce the second clock signal.

5. The n-bit binary counter according to claim 1, wherein said first adder section comprises m half-adders which are connected in series and receive the lower-order m-bit component, each of said m half-adders is provided to add a carry signal from a pre-stage half-adder to a corresponding bit of the lower-order m-bit component, and a first stage half-adder of the m half-adders receives "1" as a carry signal thereof.

6. The n-bit binary counter according to claim 1, wherein said second adder section comprises (n−m) half-adders which are connected in series and receive the lower-order (n−m)-bit component, each of said (n−n) half-adders is provided to add a carry signal from a pre-stage half-adder to a corresponding bit of the lower-order (n−m)-bit component, and a first stage half-adder of the (n−n) half-adders receives "1" as a carry signal thereof.

7. An N-bit binary counter, comprising:

a first binary counter that is responsive to a first clock signal and generates a first carry signal at an output thereof;

a second binary counter that is responsive to a second clock signal and the first carry signal; and means, responsive to the first clock signal and the first carry signal, for selectively generating the second clock signal as a periodic signal in-sync with the first clock signal if the first carry signal is in a first logic state and as an inactive signal if the first carry signal is in a second logic state opposite the first logic state.

8. The binary counter of claim 7, wherein said means for selectively generating the second clock signal comprises an AND gate having a first input electrically coupled to the output of the first binary counter and a second input that receives the first clock signal; and wherein said second binary counter has a clock input electrically coupled to an output of the AND gate.

9. The binary counter of claim 8, wherein said first and second binary counters are both M-bit binary counters; wherein M and N are integers; and wherein M and N are preselected to meet the following relationship: $(2^M+M-2) \leq N \leq (2^{M+1}-1)$.

10. The binary counter of claim 8, wherein said first binary counter comprises a first plurality of half-adders and a respective first plurality of D-type flip-flops; and wherein sum outputs of the first plurality of half-adders are data inputs to the first plurality of D-type flip-flops.

11. The binary counter of claim 10, wherein said first and second binary counters are both M-bit binary counters; wherein M and N are integers; and wherein M and N are preselected to meet the following relationship: $(2^M+M-2) \leq N \leq (2^{M+1}-1)$.

12. The binary counter of claim 7, wherein said first and second binary counters are both M-bit binary counters; wherein M and N are integers; and wherein M and N are preselected to meet the following relationship: $(2^M+M-2) \leq N \leq (2^{M+1}-1)$.

13. A N-bit binary counter, comprising:

a first binary counter that performs a count-up operation in response to a first clock signal (CLK1) and generates a carry signal (CS) at an output thereof; and a second binary counter that is responsive to a second clock signal (CLK2) as CLK1^CS, where "^" represents a boolean AND operation.

14. The counter of claim 13, wherein said second binary counter performs a count-up operation whenever the carry signal CS equals 1 when the second clock signal CLK2 undergoes a leading edge transition.

* * * * *

UNITED STATES PATENT AND TRADEMARK OFFICE
CERTIFICATE OF CORRECTION

PATENT NO. : 6,434,588 B1
DATED : August 13, 2002
INVENTOR(S) : Kim et al.

It is certified that error appears in the above-identified patent and that said Letters Patent is hereby corrected as shown below:

Column 5,
Line 45, please change "$[(n-m)/2^n+m]$" to -- $[(n-m)/2^m+m]$ --.

Collumn 6,
Line 9, please change "An" to -- A --.
Line 30, please change "claim 8" to -- claim 7 --.
Line 40, please change "claim 10" to -- claim 8 --.
Line 45, please change "claim 7" to -- claim 9 --.
Line 55, please change "CLK1^CS, where "^"" to -- CΛLK1CS, where "Λ" --.

Signed and Sealed this

Third Day of August, 2004

JON W. DUDAS
*Acting Director of the United States Patent and Trademark Office*